V. G. APPLE.
LAMINATED STRUCTURE AND METHOD OF MAKING SAME.
APPLICATION FILED MAY 14, 1920.
1,390,242. Patented Sept. 6, 1921.
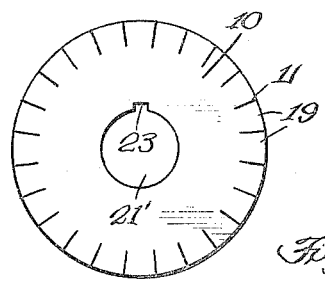
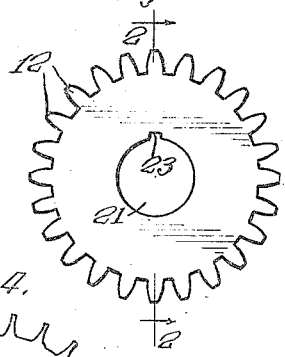
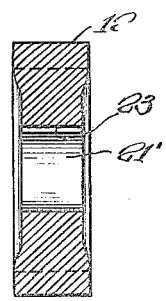
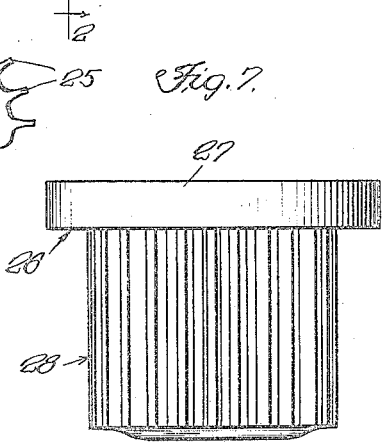
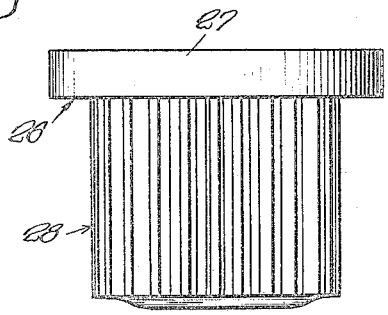
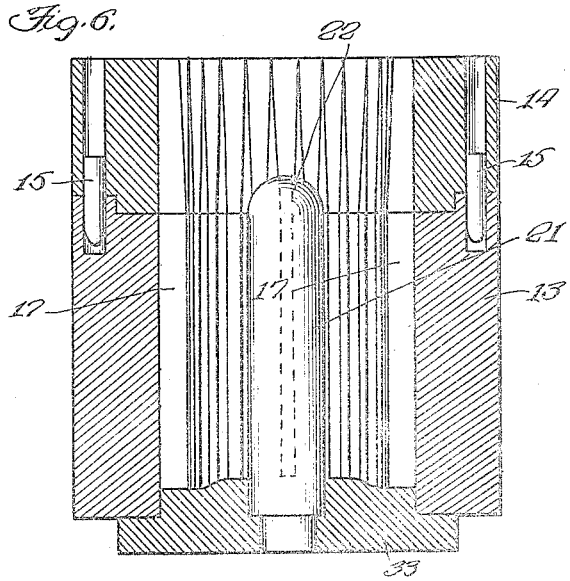
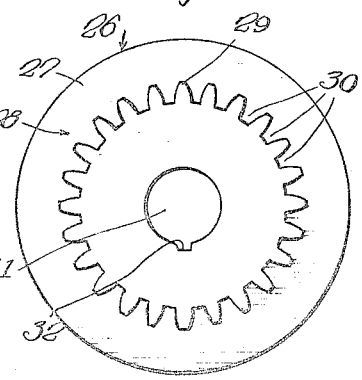
Inventor:
Vincent G. Apple
by Forée Bain Hinkle
Attys

UNITED STATES PATENT OFFICE.

VINCENT G. APPLE, OF DAYTON, OHIO.

LAMINATED STRUCTURE AND METHOD OF MAKING SAME.

1,390,242.  Specification of Letters Patent.  Patented Sept. 6, 1921.

Application filed May 14, 1920. Serial No. 381,395.

*To all whom it may concern:*

Be it known that I, VINCENT G. APPLE, a citizen of the United States, residing at Dayton, in the county of Montgomery and State of Ohio, have invented certain new and useful Improvements in Laminated Structures and Methods of Making Same, of which the following is a specification.

This invention relates to improvements in laminated structures and the method of making the same and has especial reference to a method of making such structures from blanks compacted and then united by adhesive substances.

One of the specific objects of the invention is the manufacture of gear wheels, and the like structures, of fibrous sheets associated with a suitable adhesive which causes them to adhere when subjected to pressure and heat.

Another object is to provide a series of absorbent sheets, or blanks, of which the gear is to be made, coated, impregnated or otherwise associated with a suitable adhesive, such for example, as a phenolic condensation product and conform the teeth and compact the blanks in a hollow die by subsequently applied pressure.

Another object is the provision of a method of making a gear, as above described, of fibrous disks, such as cotton duck, paper, or the like, and making the fibrous content of the teeth greater than that of the body of the structure to strengthen the teeth.

Another object is the provision of a method of reinforcing the fibrous teeth by suitable numbers of disks of metal, or other relatively strong material, having narrower teeth than the finished gear and surrounding the metal teeth with fibrous material and the adhesive product.

Another object is to incorporate with the gears made by this method a friction reducing material, such as graphite, so that the gear will not wear so rapidly and will make less noise in operation.

Other, further and more specific objects of the invention will become readily apparent, to persons skilled in the art, from a consideration of the following description, when taken in conjunction with the drawings, wherein:—

Figure 1 shows an end view of the completed gear.

Fig. 2 is a transverse section taken on line 2—2 of Fig. 1.

Fig. 3 is one of the fibrous disks, such as cotton duck or the like.

Fig. 4 is a metal disk having rather narrow teeth, for insertion between the fabric disks.

Fig. 5 is a broken away top plan view of the die shown in Fig. 6.

Fig. 6 is a central section of the hollow die and attachment.

Fig. 7 is a plunger die for insertion in the structure shown in Fig. 6, for the purpose of compacting the disks.

Fig. 8 is an inverted plan view of Fig. 7.

In all the views the same reference characters are employed to indicate similar parts.

In carrying the invention into effect, a gear may satisfactorily be made by this method by impregnating sheets of fibrous material, such as cotton duck, with an adhesive material, such for example, as phenolic condensation product, then punching blanks from the impregnated or coated sheets. These blanks are substantially of the same extreme diameter as the finished gear. Instead of punching the teeth in the blanks, only regularly spaced-apart, radially extending slits, equal in depth and number to the teeth to be contained in the finished gear are made in the periphery of the blanks.

In the simplest form these blanks are stacked or superposed in a hollow die having as many bars as there are interdental spaces between the teeth of the finished gear. These bars are spaced apart on the inner surface of the hollow die and serve as formers for the teeth. By making the radial slits in the blanks, instead of cutting the teeth therein there is in consequence an excess of material in that part of the blank where the teeth are to appear. By folding back this surplus fiber into the tooth spaces within the hollow die, the teeth will thereby be strengthened by the inclusion of a larger amount of fibrous material within each tooth area than there is included in an equal area of the body part of the gear. When it is desired to further strengthen the gear structure, a metal blank, having relatively thin or narrow teeth may be placed within the die, in alternate relation with the fibrous, impregnated blanks, whereupon this excess of fibrous material will completely inclose the metal disks by forming around them when pressure is applied to the structure.

When a pulley, having a friction face is to be made, I may incorporate with the composite material, a friction producing substance, such as powdered resin, or when desired, powdered graphite may be incorporated with the gear composition to produce the anti-friction surface thereof.

In practising the invention in accordance with the foregoing description and the apparatus herein illustrated, I provide a series or sufficient number of disks of cotton duck, or fabric, or the like, such as shown in Fig. 3, and indicated by reference character 10. These disks, or blanks, may be first punched from the material that is subsequently saturated or coated with an adhesive material, such as phenolic condensation product. I cut a series of radially disposed slits 11 near the periphery of the disks, corresponding in number to the number of teeth 12 to be contained in the finished product. I then place these disks, or blanks, in a hollow die 13 and for convenience of emplacement, I provide an additional attachment or part 14 to the die, secured thereto, and in register therewith by the dowel pins 15. The part 14 consists of a series of ribs 16, tapered from their bottom ends to their top ends, in both directions. That is, on either side, so that the extreme top of the ribs is substantially knife-edged, gradually tapering in width until near the bottom when the bars therein are equal to the width of the bar 16 within the die 13. When the slits 11 are placed immediately over the sharp edges 18, of the bars 16, the adjacent parts 19 of the slits are folded back into the tooth area 20 between the bars 16, thereby substantially doubling the amount of fabric within the tooth area. In the center of the die 13 is an axially extending mandrel 21 provided with a feather 22 to receive the notches 23 in the disks. The notches 23 being placed over the feather 22 cause proper registration of the peripheral parts of the disk and the folding ribs 16.

To further reinforce the tooth structure, I may place between alternate disks 10 a metal disk 24 having as many teeth as the finished gear, but the teeth 25 of the metal disks are considerably narrower, leaving greater interdental spaces between the teeth. When the metal disks 24 are used, the surplus material between the slits 11 of the disk 10 are folded over the relatively narrow teeth 25 and completely surround them leaving the teeth 25 covered by and well within the surrounding fabric mass.

After the disks have been placed in the hollow die 13, then a plunger die 26 consisting of a disk portion 27 and a cylindrical portion 28 is placed within the die 13 and pressure applied thereto. The cylindrical portion 28 is provided with as many teeth 29 as there are teeth in the finished gear. The teeth 29 of the plunger are received in the spaces 20 within the die and the bars 16 of the die are received within the interdental spaces 30 of the plunger. The plunger has a central, axial opening 31 with a slot 32 to pass over the central mandrel 21 and the feather 22. The central mandrel 21 is placed in a bottom plate 33 which closes the end of the die 13.

After the disks have been properly assembled, within the die 13, the plunger 28 is placed within the die and pressure is applied. The disks are thus compacted and the adhesive material properly distributed throughout the mass. While the contents of the die are under pressure, sufficient heat is applied to cause the reaction of the cement to unite the mass firmly together as a composite whole.

While I have herein shown a single embodiment of my invention for the purpose of clear disclosure, it will be manifest that changes may be made therein, within the scope of the appended claims.

Having described my invention what I claim as new and desire to secure by Letters Patent is:—

1. The method of making laminated structures which consists in assembling a series of blanks differing in outline from the finished article and associating therewith a suitable adhesive material and folding back upon the blanks parts thereof to reinforce the overlaid parts; compacting the assembled material in a hollow die conforming in outline to the finished article thereby changing the outline of the blank to conform to the die; and heating the die and its contents to harden the material.

2. The method of making laminated structures which consists in assembling a series of blanks of absorbent sheet material, differing in outline from the finished article and associating therewith a phenolic condensation product and folding back upon the blanks parts thereof to reinforce the overlaid parts; compacting the assembled material in a hollow die conforming in outline to the finished article, by application of pressure, thereby changing the outline of the blanks to conform to the die; and heating the die and its contents while under pressure to solidify the material.

3. The method of making laminated gears which consists in producing a series of circular disks of flexible absorbent material;

slitting the disks near their periphery into as many contiguous segments as there are to be teeth in the finished gear and associating therewith phenolic condensation product to cause the disks to adhere together; turning back upon itself parts of each segment to form reinforced teeth; and compacting and hardening the assembled material in a die conforming in outline to the finished gear, by application of pressure and heat to the die and contents.

4. The method of making laminated gears which consists in producing a series of circular disks of flexible absorbent material; slitting each disk near its periphery, into as many segments as there are to be teeth in the gear; placing between selected absorbent disks, metal disks having as many teeth as there are to be teeth in the finished gear, but of smaller dimensions; associating with said disks phenolic condensation product, to cause the same to adhere together; turning back upon itself a slitted part of each segment thus inclosing the metal teeth; compacting the assembled material in a die conforming in outline to the finished gear, by application of pressure; and heating the die and its contents.

5. The process of making a gear of a series of fabric disks which consists in punching out of a sheet of fabric a plurality of blanks to form the teeth and the body part of the gear; stacking the blanks in a hollow die having spaces to form the teeth of the gear; increasing the amount of fabric in the area occupied by the peripheries of the blanks to render the teeth more dense than the body part of the gear; associating with the blanks, or laminæ, a phenolic condensation product; and applying pressure and heat to the contents of the die to form the gear and compact and harden said product.

6. The method of making laminated structures which consists in compacting a series of blanks in a proper die associated with a phenolic condensation product and a friction modifying material, then heating the die and contents to harden said product.

7. The method of making laminated structures characterized by setting together a series of blanks, differing in outline from the finished article, and a plastic material which will solidify under heat and pressure and folding back upon the blanks parts thereof to reinforce the overlaid parts; compressing the blanks and material together to form the article; and solidifying the material under heat and pressure.

8. The method of making laminated structures characterized by setting together a series of blanks, differing in outline from the finished article, and a phenolic condensation product and folding back upon the blanks parts thereof to reinforce the overlaid parts; and subjecting the blanks and product to heat and pressure to compact and form the structure and solidify said product.

In testimony whereof I hereunto subscribed my name.

VINCENT G. APPLE.